United States Patent [19]

Sommers

[11] 4,176,984
[45] Dec. 4, 1979

[54] FISH HOLDING PAN ON TRAVELING WATER SCREEN AND METHOD OF FLUSHING SAME

[75] Inventor: Richard J. Sommers, New Britain, Pa.

[73] Assignee: FMC Corporation, San Jose, Calif.

[21] Appl. No.: 836,929

[22] Filed: Sep. 26, 1977

[51] Int. Cl.$^2$ .............................................. F02B 8/08
[52] U.S. Cl. ..................................... 405/81; 210/154; 193/11; 119/3
[58] Field of Search .............. 210/154, 155, 158, 159; 193/2 R, 11; 61/14, 15, 21; 119/3; D7/46, 85; D23/1, 68; 405/81, 82, 83

[56] References Cited

U.S. PATENT DOCUMENTS

| D. 40,106 | 6/1909 | Yacoobian | D23/1 |
|---|---|---|---|
| 1,207,376 | 12/1916 | Davidson | 210/158 |
| 1,208,655 | 12/1916 | Reynolds | 210/158 |
| 1,514,673 | 11/1934 | Roddy | 210/160 |
| 1,910,860 | 5/1933 | Savers | 210/158 |
| 2,102,570 | 12/1937 | Lind | 210/176 |
| 2,804,209 | 8/1957 | Carlton et al. | 210/158 |
| 2,851,162 | 9/1958 | Bleyer | 210/158 |
| 2,922,282 | 1/1960 | Dohrer | 405/82 |
| 4,064,048 | 12/1977 | Downs et al. | 210/160 |

Primary Examiner—Charles N. Hart
Assistant Examiner—David R. Sadowski
Attorney, Agent, or Firm—J. W. Edwards; J. F. Verhoeven

[57] ABSTRACT

In a water screening installation, a traveling water screen removes both refuse and aquatic life from a stream. The aquatic life, such as fish and shrimp, are uplifted in pans that are mounted on an ascending run of the screen. At a location above the stream, the pans are gently flushed by a low pressure spray of water. The fish are then returned to the stream, as soon as practical, to keep the mortality rate at a minimum. Each of the pans has an inner side that is parallel to a screen tray within the traveling water screen. This inner side is also tangential to a curved bottom portion of the pan. Extending tangentially from the opposite side of the curved bottom portion of the pan is an outer side that has a continuing profile at or below an extended tangential line from the point where the outer side is tangential to the curved bottom portion. A spray of water that is directed against the inner side of the pan is deflected to flow smoothly about the curved bottom portion and the outer side of the pan to a discharge lip that curves from the outer side in a direction reverse to the curved bottom portion. Water standing in the pan together with any fish therein are drawn along with the deflected spray water undercurrent.

5 Claims, 8 Drawing Figures

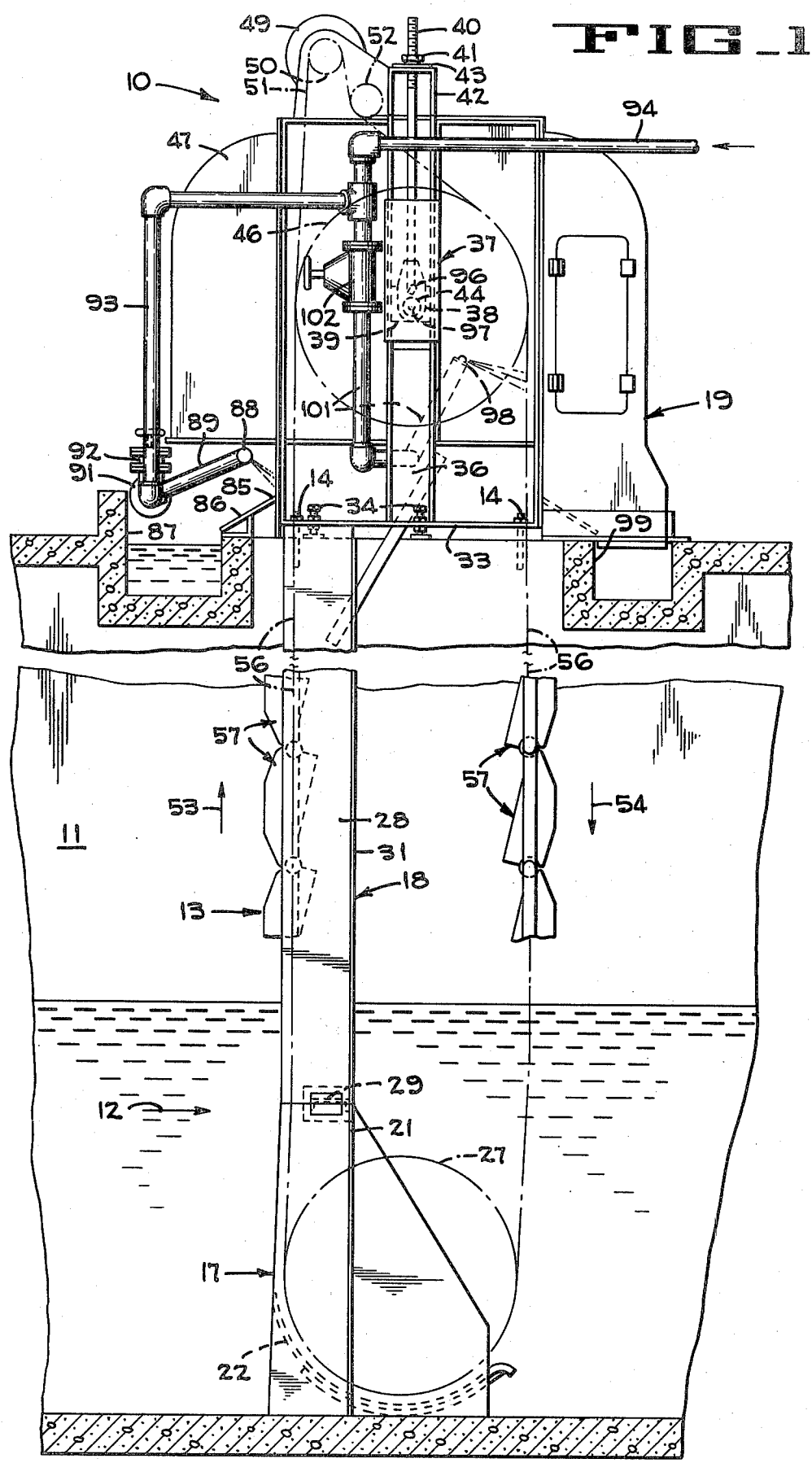
FIG_1

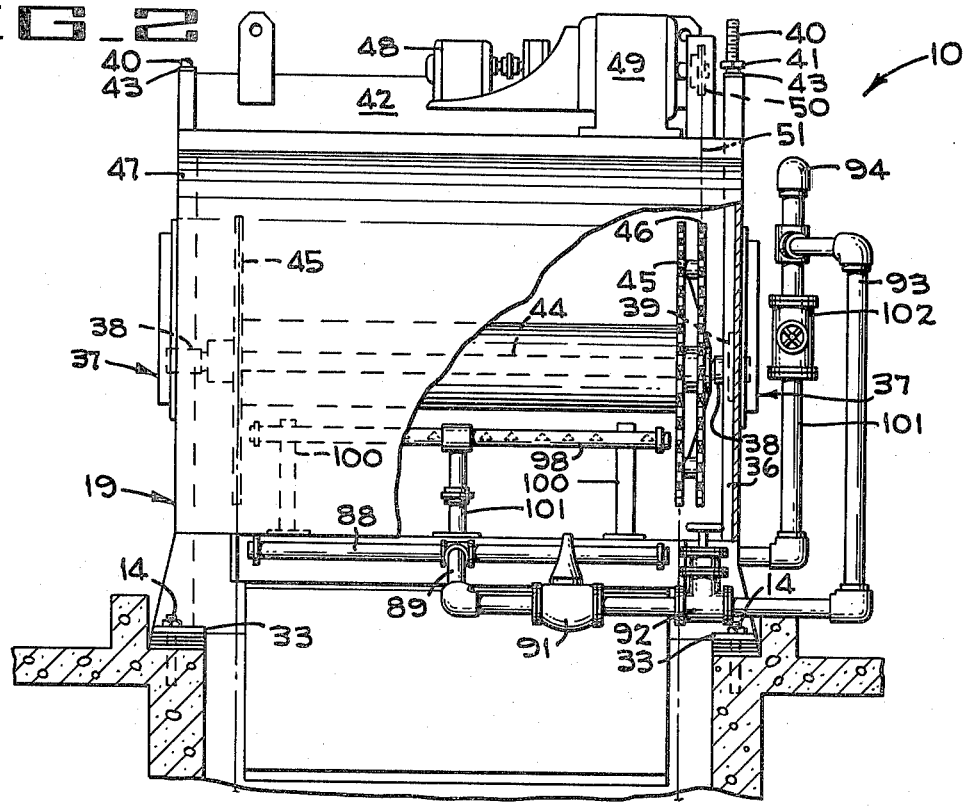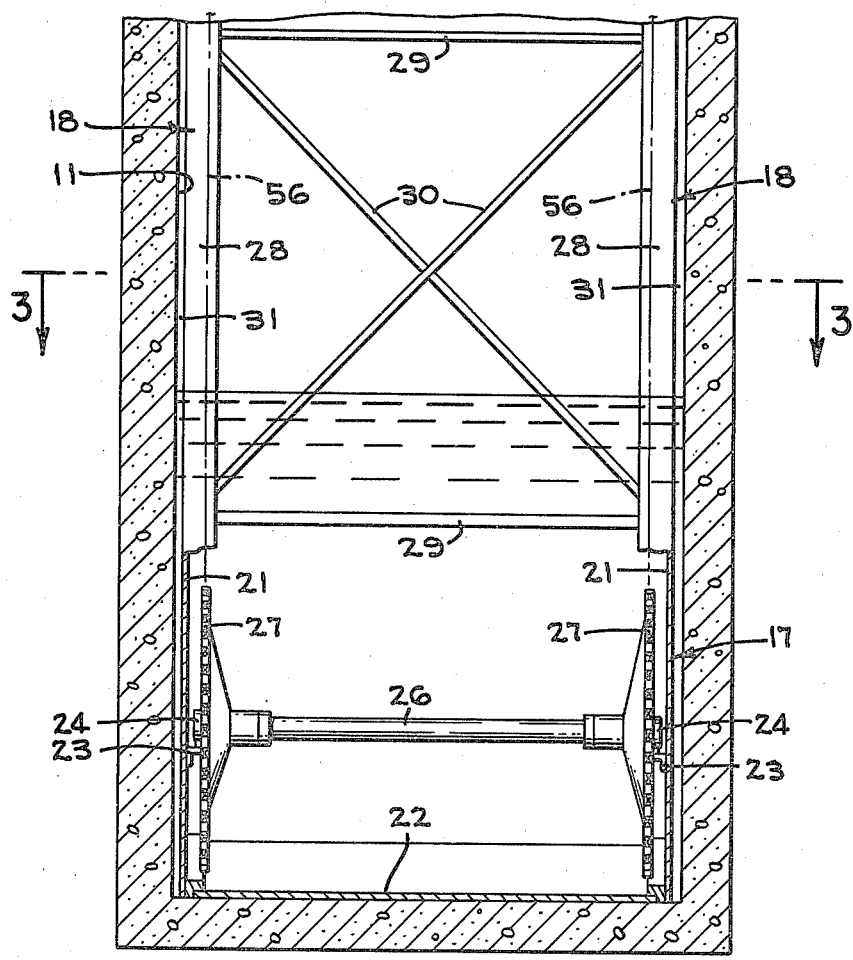

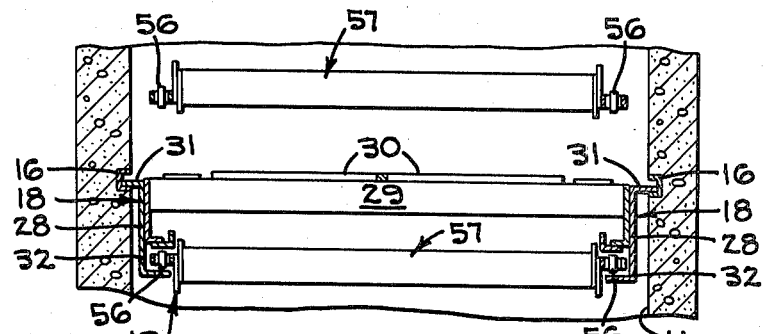
FIG_3
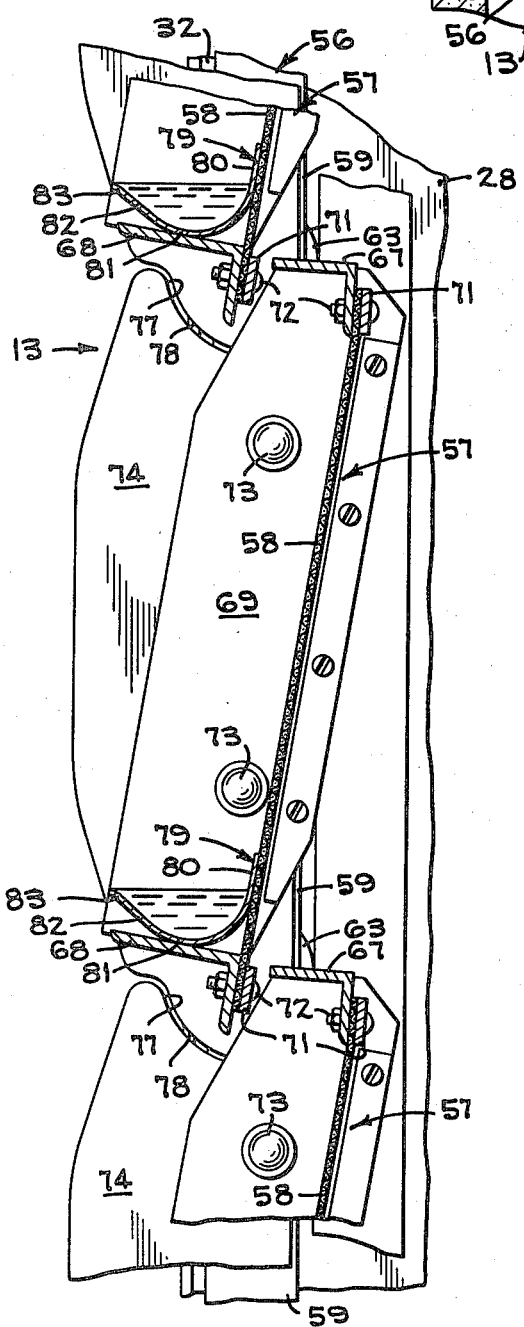
FIG_4
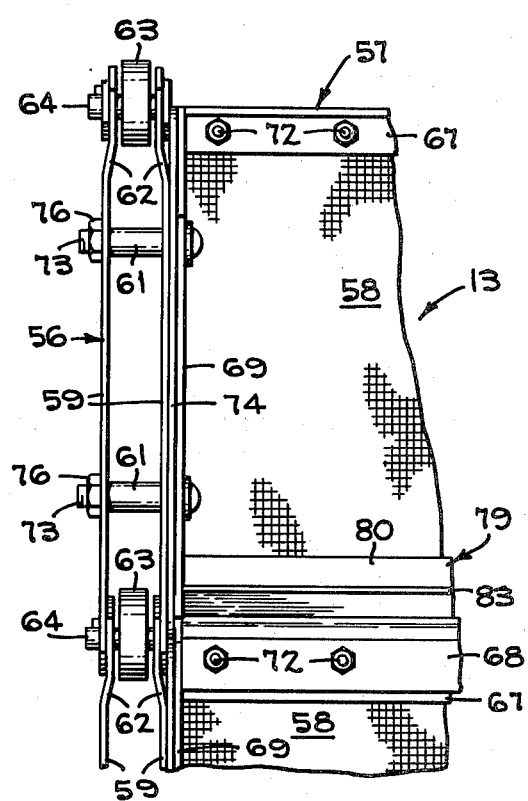
FIG_5

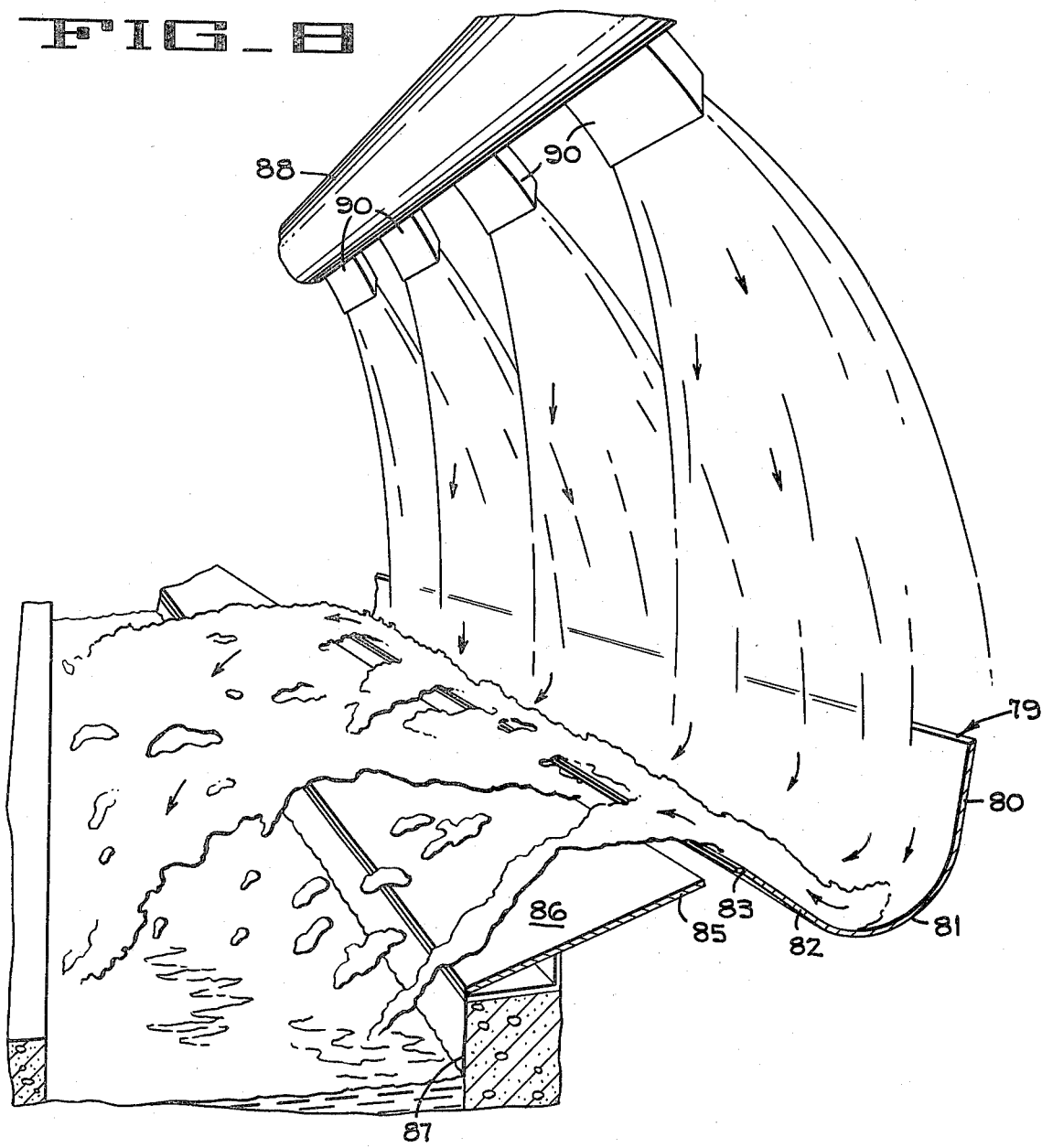
FIG_8
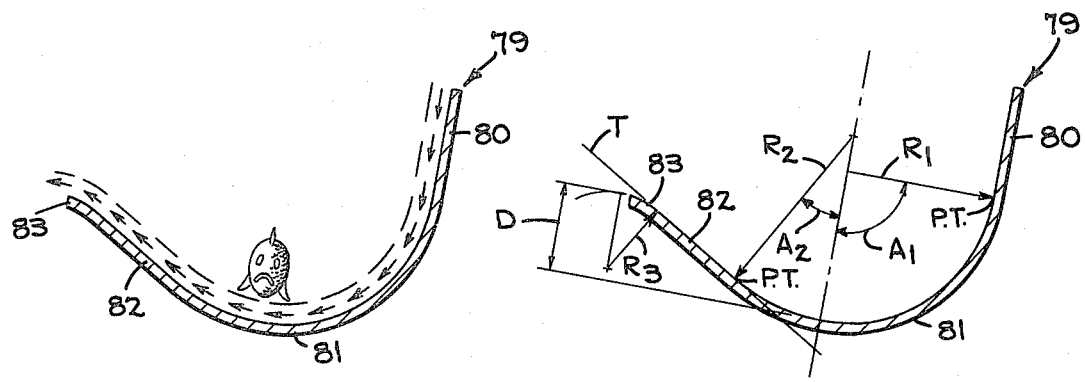
FIG_7   FIG_6

FISH HOLDING PAN ON TRAVELING WATER SCREEN AND METHOD OF FLUSHING SAME

BACKGROUND OF THE INVENTION

1. Field of the Invention

This invention relates to a traveling water screen with pans for dipping both fish and water from a stream. More specifically, the invention concerns an improved pan profile that facilitates flushing the pans with a low pressure spray of water and a method of doing the same.

2. Description of the Prior Art

Traveling water screens for the separate disposal of refuse and fish are described in U.S. Pat. No. 2,804,209 that issued to Carlton et al on Aug. 27, 1957, and U.S. Pat. No. 2,851,162 that issued to Bleyer on Sept. 9, 1958. Both of these patents show an endless belt type of traveling water screen that extends transversely of a water intake channel. The screen travels through a vertical loop for removing both refuse and fish from a stream of water in the intake channel. Above the top of the channel, on the upstream side of the screen, are devices for flushing fish from pans that are attached to the screen. The flushed fish are returned to the stream at a location remote from the screen.

The Bleyer patent shows a trough that discharges longitudinally through a discharge port at one end of the trough. There is no indication that the transverse profile of the trough could be utilized in the lateral flushing of fish from the trough. This patent also teaches that when fish are subjected to the action of high pressure cleaning jets or sprays they are frequently killed or seriously injured.

The Carlton et al patent shows a fish holding pan that is flushed by a spray of water directed transversely of the pan to flow about a curved bottom thereof. This patent shows a discharge lip formed by an outer edge wall of the pan that is inclined upwardly at an obtuse angle with the bottom wall of the pan. Such an inclined outer edge wall increases the depth of water retained in the pan after dipping in the stream, but such a wall also deflects upwardly the spray water flowing transversely about the pan bottom. Thus, the velocity of spray water flowing about the pan bottom is reduced, and the upwardly deflected water acts as a lateral barrier for water standing in the pan.

SUMMARY OF THE INVENTION

The purpose of the present invention is to protect aquatic life, such as fish and shrimp, at a water screening installation, thereby achieving a low mortality rate and maintaining the ecology at the installation. A traveling water screen has attached thereto pans that dip both water and aquatic life from a stream. The pans are elevated to a position above the stream, where the contents of the pans are gently flushed into a trough for return to the stream at a remote location. An object of the present invention is to provide a pan that holds water therein, of sufficient depth to maintain small fish (1 to 4 inches in length) immersed therein, and this pan can be gently flushed with spray water so that minimal impact force is imposed upon any fish within the pan. Another object of the invention is to provide a method of flushing a fish holding pan by a gentle flat spray formed by a series of spray nozzles with slightly overlapping spray patterns.

In accordance with the present invention, an improved fish holding pan extends in a longitudinal direction transversely of a traveling water screen. The pan has a transverse section formed by an inner side, an outer side, and a curved bottom portion extending between the sides that are tangential to the bottom portion. The transverse section is shaped to deflect a spray of water, directed against the inner side, to flow smoothly about the curved bottom portion and the outer side. The outer side has a continuing profile that extends at or below the extended tangential line from where the outer side joins the curved bottom portion. Thus, the outer side does not constrict the lateral flow of spray water about the pan, nor is the discharging water deflected upward to form a lateral barrier for water standing in the pan.

In a preferred form of the invention, a discharge lip is provided at the extended end of the outer side. This discharge lip curves from the outer side in a direction reverse to the curved bottom portion. The discharge lip is located at approximately the same level as the point of tangency between the inner side and the curved bottom portion. The curved bottom portion is defined by compound curves having arcs totaling 120°. A first curve section that is tangent to the spray receiving side has a radius of 2 inches with a central angle of 90°. Continuing from the first curve section is a second curve section that has a radius of 2 ½ inches with a central angle of 30°. The pan has a maximum depth of about 1 ¾ inches.

Further in accordance with the invention, the pans are gently flushed by supplying water to spray nozzles at a pressure and a quantity of flow sufficient to form a gentle flat spray. The spray from the nozzles is directed into an overlapping pattern forming an elongated sheet of water that flows downwardly to impinge longitudinally against an inner side of the pan. This flowing water is deflected by the pan to flow transversely about the smoothly curved bottom and an outer side, thereby drawing water standing in the pan and any fish therein along with the undercurrent about the pan bottom to overflow from the outer side. In a preferred embodiment of the invention, the pressure of water supplied to the nozzles is about 8 p.s.i. and the quantity of flow is about 15 gallons per minute per longitudinal foot of the pan.

BRIEF DESCRIPTION OF THE DRAWING

FIG. 1 is a side elevation view, partly broken away, of a traveling water screen embodying the present invention.

FIG. 2 is a front elevation view, partly in section, of the screen shown in FIG. 1.

FIG. 3 is a horizontal section taken on the line 3—3 of FIG. 2.

FIG. 4 is an enlarged fragmentary view taken through a central section of the upstream run of the traveling water screen.

FIG. 5 is a partial enlarged front elevational view of the screen tray.

FIG. 6 is a transverse section of the fish holding pan, and this section illustrates the geometry of the pan.

FIG. 7 is a transverse section of a fish holding pan filled with water, and this section illustrates the current of spray water through the pan.

FIG. 8 is a perspective view illustrating the flushing of a fish holding pan.

DESCRIPTION OF THE PREFERRED EMBODIMENT

Looking now at FIGS. 1 and 2, a water screening installation 10 is located on an intake channel 11, through which a stream of water flows, in the direction indicated by an arrow 12, from any convenient natural source, such as a river, lake, or other large body of water. A traveling water screen 13 extends transversely of the channel. This screen has a transverse section in the form of a vertical loop, and the screen is mounted to move endlessly about the path defined by the vertical loop.

The sides of the channel 11 are defined by concrete walls. Anchor bolts 14 project upwardly from the tops of these walls. Guideways 16 extending vertically along opposite sides of the channel, in opposed relationship with each other, as shown in FIG. 3. These guideways can be either embedded in the walls, as shown, or else anchored to the walls. Looking again at FIGS. 1 and 2, the traveling water screen 13 is guided through a boot section 17 near the bottom of the channel, intermediate sections 18 that fit within the guideways, and a head section 19 that is held in place upon the tops of the channel walls with the anchor bolts.

The boot section 17 has a pair of parallel uprights 21, that extend vertically along opposite sides of the channel 11. A seal 22 extends laterally across the channel, between the lower portions of the uprights, to prevent refuse from passing beneath the traveling water screen 13. Mounted upon each upright side and facing inwardly of the channel, as shown in FIG. 2, is a bracket 23 that supports a bearing 24. A foot shaft 26 extends transversely across the channel. Each end of the shaft is journalled in one of the bearings 24. A pair of foot sprockets 27 are mounted by their central hubs upon the foot shaft. The hubs are keyed to the shaft so that the sprockets will rotate with the shaft.

The intermediate sections 18 have a pair of parallel uprights 28, that extend vertically along opposite sides of the channel 11, as shown in FIGS. 2 and 3. These uprights are supported laterally by horizontal braces 29 and by diagonal braces 30. The uprights are formed welded structural shapes that have flanges 31 projecting laterally outward into the guideways 16 to seal the channel therebetween and to hold the uprights in place. Each upright defines a channel-like guide 32 facing inwardly towards the middle of the channel.

With reference to FIGS. 1 and 2, the head section 19 has a pair of base plates 33 that fit about the anchor bolts 14. These plates extend longitudinally of the channel 11, along the tops of the side walls. Leveling screws 34 (FIG. 1) extend through each base plate and contact the top of the underlying side wall for leveling the head section. A side frame member 36 extends vertically upward from the mid-portion of each base plate on each side of the channel. Each side frame member supports a take-up mechanism 37. Each take-up mechanism 37 has a bearing 38 that is guided for movement upon one of the frame members 36 by a flanged block 39. The bearing is vertically supported by a threaded rod 40 and an adjusting nut 41. The bearings are aligned transversely of the channel, at a location that is spaced vertically above and slightly downstream from the foot shaft 26. Lateral support between the side frame members is provided by a transverse beam 42. This beam has openings therein through which the threaded rods extend, and the adjusting nuts rest upon a bearing plate 43 that is mounted on top of the transverse beam. Rotation of the nuts will cause vertical movement of both the threaded rods and bearings, for adjusting the head section 19.

Journalled within the bearings 38 is a head shaft 44 upon which a pair of head sprockets 45 are mounted in substantial vertical alignment with the foot sprockets 27. A drive sprocket 46 is mounted to one of the head sprockets at a location between the head sprocket and the adjacent side frame member 36. A housing 47 encloses the head shaft, the head sprockets, and the drive sprocket that further define the head section 19.

Mounted upon the top of the housing 47 is a drive having a motor 48 that is suitably connected through a speed reduction unit 49 to a sprocket 50 over which is trained a drive chain 51 for rotating the drive sprocket 46. An idler sprocket 52 is provided for maintaining tension in the drive chain. When the drive sprocket rotates the head shaft 44, the traveling water screen 13, that is trained about the head sprockets 45 and the foot sprockets 27, moves through an endless vertical loop. The upstream run of the traveling water screen moves upward, as indicated in FIG. 1 by the arrow 53, while the downstream run of the screen moves downward, as indicated by the arrow 54.

The traveling water screen 13 has two endless chains 56 that are trained about the pair of head sprockets 45 and the pair of foot sprockets 27, as shown in FIG. 2. Extending between laterally aligned links of the chains are a plurality of screen trays 57. As best illustrated in FIG. 4, adjacent longitudinal edges of the screen trays are off-set in opposite directions, relative to the pitch lines of the chains, so that the screen cloths 58 of the trays present screening surfaces that face slightly upward as the trays ascend in the upstream run.

As shown in FIG. 5, each chain 56 is formed by links that include a pair of side bars 59. These side bars are held in spaced relationship by hollow spacer bushings 61 that extend through the side bars. The side bars are stepped inwardly, as indicated at 62, so that this end of one chain link fits within the side bars of the next adjacent chain link. A roller 63 is supported for free rotational motion on a steel bushing, not shown, that is press-fitted into holes in the side bars adjacent the stepped ends. Adjacent chain links are joined by pins 64 that are press-fitted into the normally spaced end portions of the adjacent side bars which overlie the stepped ends of the side bars. A free rotating fit is maintained between the outer diameter of the bushings upon which the roller is mounted, thereby providing articulation between adjacent chain links.

Referring now to FIGS. 4 and 5, each screen tray 57 has a rectangular frame formed by an upper transverse angle member 67 and a lower transverse angle member 68 that are joined to a pair of vertical end plates 69. A panel of screen cloth 58 is secured to the framework by means of clamping strips 71 and bolts 72. Each screen tray is secured by bolts 73 to a link of the chain 56 formed by two side bars 59. These bolts pass through the vertical end plates 69, end closure plates 74, chain side bars 59, hollow spacer bushings 61, and nuts 76. It should be noted that on the ascending, upstream run, as shown in FIG. 4, the screen trays 57 are in vertical overlapping relationship, with the upper outer edge of one tray being close to the lower inner edge of the tray directly thereabove. This arrangement prevents refuse from passing between adjacent tray edges as they ascend in the upstream run.

Each end closure plate 74 has a semicircular recess 77 at its upper end and a semicircular projection 78 at its lower end. These recesses and projections permit face articulation of both the endless chains 56 and the screen trays 57 around the sprockets 27 and 45, while maintaining a substantially continuous lateral closure of the screen trays. Thus, the passage of refuse between adjacent end closure plates is prevented. As best seen in FIG. 3, the end closure plates are positioned in close proximity to the channel-like guides 32 to prevent the passage of refuse around the sides of the screen trays.

As shown in FIG. 4, each screen tray 57 has a pan 79 that is mounted by either welding or bolting in place upon the lower angle member 68. These pans extend in a longitudinal direction transversely of the screen trays. The pans project outwardly upstream from the ascending run of the traveling water screen 13 with open tops of the pans facing upward. Each pan has an inner side 80 that is mounted parallel to the screen cloth 58. A curved bottom portion 81 extends outwardly from the inner side to an outer side 82. A discharge lip 83 is provided at the outermost end of the outer side. The pans are imperforate for dipping and holding both water and aquatic life, such as fish and shrimp, from the stream of water flowing through the channel 11.

As best shown in FIG. 8, the inner side 80 and the outer side 82 are tangential to opposite ends of the curved bottom portion 81. This curved bottom portion is defined by compound curves. The first curve section, extending from the inner side, has a radius $R_1$ and a central angle $A_1$. The second curve section, continuing from the first curve section, has a radius $R_2$ and a central angle $A_2$. Extending from the second curve section, the outer side has a continuing profile extending at or below an extended tangential line T from the point where the outer side is tangential to the curved bottom portion. The discharge lip 83 is formed by a section that curves from the outer side in a direction reverse to the curved bottom portion with a radius $R_3$. The discharge lip is located at approximately the same level as the point of tangency P.T. between the inner side and the curved bottom portion. The pan has a maximum depth D.

For a typical water screening installation, the pan 79 has the following preferred dimensions. The radius $R_1$ is 2 inches, and the central angle $A_1$ is 90°. The radius $R_2$ is 2½ inches, and the central angle $A_2$ is 30°. The maximum depth D is 1¾ inches at a location in the middle third of the pan width.

Any fish carried against a screen cloth 58, by water flowing through the channel 11, will be dipped from the stream by the following pan 79 in the ascending run of the traveling water screen 13. At a location above the stream as shown in FIG. 1, a resilient lip 85 of a spill plate 86 projects towards the pans. The spill plate slopes downwardly from the resilient lip to a trough 87 having water therein for returning fish to the channel at a remote location. The traveling water screen moves intermittently, and when each pan discharge lip 83 is opposite the resilient lip 85, the pan is flushed.

The flushing action within a pan 79 is best illustrated in FIGS. 7 and 8. A thin spray of water is directed to impinge against the pan inner side 80. The spray is deflected by the pan to flow smoothly about the curved bottom portion 81, the outer side 82, and the discharge lip 83. Water standing in the pan and any fish therein are drawn along with the deflected spray water that forms an undercurrent about the bottom of the pan. Fish tend to seek a position in the pan where they can float upright without contacting the pan. Thus, when the spray water is directed into the pan, the fish are normally positioned to avoid the striking momentum of the spray water. Then, the fish are more gently drawn along with the undercurrent resulting from the spray water. The contents of the pan are soon emptied, and the continuing spray water flows in a curved stream with a shallow depth about the interior of the pan.

The spray water for flushing the pans 79 is supplied by a header 88 to a series of spray nozzles 90. The water should be supplied to the spray nozzles at a pressure with a quantity of flow sufficient to form a gentle flat spray. A pressure of 8 p.s.i. with a quantity of flow of 15 gallons per minute per foot of the pan in a longitudinal direction has provided satisfactory results. The spray water is directed by the nozzles into a slightly overlapping pattern to form an elongated sheet of water that is directed downwardly to impinge against the inner side 80 of the pan. The elongated sheet of water extends longitudinally of the pan.

Water is supplied to the header by a pipeline 89 having therein a solenoid controlled shut-off valve 91 that effects an intermittent flow of water to the header.

A valve 92 regulates the flow of water to the valve 91 and to the header. The valve 91 is controlled by a solenoid that is regulated by a limit switch 96. This switch is attached to a bracket on the head shaft bearing 38. A cam 97, that is mounted on an extension of the head shaft 44, operates the limit switch as the head shaft rotates. The operation of the limit switch is synchronized with the movement of the pans 79 so that the valve 91 will open for flushing pans only when the pans are aligned opposite the resilient lip 85 of the spill plate 86.

The screen trays 57 move upward from the spill plate 86 over the sprocket wheels 45 and then move downward in the downstream run of the chains 56. Refuse collected on the screen cloths 58 is removed from the screen trays by jets of water that are discharge from spray nozzles in a stationary header 98 which extends transversely of, and is positioned adjacent the inner side of, the downstream run of the chains. The header 98 is located at a level above that of a refuse or trash disposal trough 99 and jet sprays from the header nozzles are directed, through the screen trays, toward the trash disposal trough, to remove trash from the screen cloths as they move past the jets. The header is supported within the housing 47 by stanchions 100, and water is introduced into the middle of the header by a pipeline 101 which passes outwardly through the side of the housing. A shut-off valve 102 is provided in the pipeline 101, to regulate the flow of water through the header, and this pipeline is connected, with the pipeline 93, to the common supply line 94.

From the foregoing description, it will be apparent that the present invention will protect aquatic life, such as fish and shrimp, at a water screening installation. An improved pan 79 holds water at sufficient depth to maintain small fish immersed within the pan, and this pan can be gently flushed with spray water so that minimal impact force is imposed upon any fish within the pan. The pan is flushed by a gentle flat spray that is directed against an inner side 80 of the pan. This spray is deflected by the pan to flow smoothly about a curved bottom portion 81 of the pan and an outer side 82, thereby drawing water, previously standing in the pan, with the undercurrent.

Although the best mode contemplated for carrying out the present invention has been herein shown and described, it will be apparent that modification and variation may be made without departing from what is regarded to be the subject matter of the invention.

What is claimed is:

1. An elongated pan for dipping water and aquatic life from a body of water, said pan being adapted to be flushed by water flowing laterally through the pan for gently removing aquatic life therefrom, said pan having a curved bottom portion with inner and outer sides projecting upwardly therefrom and a discharge lip located at the top of the outer side, said discharge lip extending horizontally in a direction lengthwise of the pan to provide a uniform level over which water is discharged from the pan, said pan having a smoothly curved interior surface profile taken on a transverse section through the pan with the inner and outer sides being tangential to the curved bottom portion, said outer side and said discharge lip having an upward and outward inclination that does not exceed the slope of an extended tangent line from the point of tangency between the outer side and the curved bottom portion, whereby spray water directed against the inner side is deflected downward to flow smoothly about the curved bottom portion and then to flow upward and outward over the outer side and the discharge lip without any further transitional increase in slope, said pan interior surface profile on a transverse section across the discharge lip being curved from the outer side in a direction reverse to the curved bottom portion, said pan interior surface profile on a transverse section across the curved bottom portion being defined by compound curves having arcs totaling 120°, said curved bottom portion being defined by a first curve section that is tangent to the inner side, said first curve section having a radius of 2 inches with a central angle of 90°; and a second curve section continuing from the first curve section, said second curve section having a radius of $2\frac{1}{2}$ inches with a central angle of 30°.

2. The elongated pan according to claim 1, wherein said pan has a maximum depth of about $1\frac{3}{4}$ inches.

3. The elongated pan according to claim 1, wherein said pan has a maximum depth located within the middle third of the pan in transverse section.

4. The elongated pan according to claim 1, wherein said discharge lip is located at approximately the same level as the point of tangency between the inner side and the curved bottom portion.

5. The elongated pan according to claim 1, wherein said pan is mounted upon a traveling water screen at a water screening installation with the inner side of the pan being substantially vertical as it travels upwardly in an upstream run of the traveling water screen.

* * * * *